United States Patent [19]
Lee

[11] Patent Number: 5,655,785
[45] Date of Patent: Aug. 12, 1997

[54] HIGH PERFORMANCE IN-LINE ROLLER SKATE WHEELS

[76] Inventor: Charles J. Lee, 11404 Prescott La., Westchester, Ill. 60154

[21] Appl. No.: 495,921

[22] Filed: Jun. 28, 1995

Related U.S. Application Data

[63] Continuation-in-part of Ser. No. 411,327, Mar. 27, 1995.
[51] Int. Cl.⁶ ............... A63C 17/14; A63C 17/02; A63C 17/22
[52] U.S. Cl. .................. 280/11.22; 301/5.7; 301/5.3
[58] Field of Search .................. 280/11.2, 11.22; 301/5.3, 5.7

[56] References Cited

U.S. PATENT DOCUMENTS

| | | | |
|---|---|---|---|
| D. 341,863 | 11/1993 | Cavasin | D21/226 |
| D. 342,113 | 12/1993 | Cavasin | D21/226 |
| D. 343,669 | 1/1994 | Pratt | D21/226 |
| D. 345,405 | 3/1994 | Cavasin | D21/226 |
| D. 346,192 | 4/1994 | Miller et al. | D21/226 |
| D. 346,633 | 5/1994 | Conte | D21/226 |
| D. 347,672 | 6/1994 | Arney et al. | D21/226 |
| 4,909,523 | 3/1990 | Olson | 280/11.2 |
| 5,048,848 | 9/1991 | Olson et al. | 180/11.22 |
| 5,068,956 | 12/1991 | Malewicz | 29/437 |
| 5,183,276 | 2/1993 | Pratt | 280/11.22 |
| 5,190,301 | 3/1993 | Malewicz | 280/11.22 |
| 5,207,454 | 5/1993 | Blankenburg et al. | 280/843 |
| 5,271,633 | 12/1993 | Hill, Jr. | 280/11.22 |
| 5,286,043 | 2/1994 | Tkaczyk | 280/11.22 |
| 5,303,940 | 4/1994 | Brandner | 280/11.22 |
| 5,308,152 | 5/1994 | Ho | 301/5.3 |
| 5,310,250 | 5/1994 | Gonsior | 301/5.3 |
| 5,312,844 | 5/1994 | Gonsior | 521/99 |
| 5,356,209 | 10/1994 | Hill | 301/5.7 |
| 5,374,072 | 12/1994 | Landers | 280/11.22 |
| 5,482,301 | 1/1996 | Babcock | 280/11.2 |
| 5,503,466 | 4/1996 | Lew | 301/5.3 |

*Primary Examiner*—Brian L. Johnson
*Assistant Examiner*—Jonathan E. Butts
*Attorney, Agent, or Firm*—Thomas W. Tolpin

[57] ABSTRACT

High speed, light weight wheels are provided for in-line roller skates. The high performance wheels each have at least one bearing, a special hub with a light weight fiber-reinforced core, and a high performance tire. The core can comprise symmetrical core sections and can have an array of spokes which connect a hub and an inner rim. Desirably, the light weight core can have a hollow shell upon which the tire is secured.

6 Claims, 10 Drawing Sheets

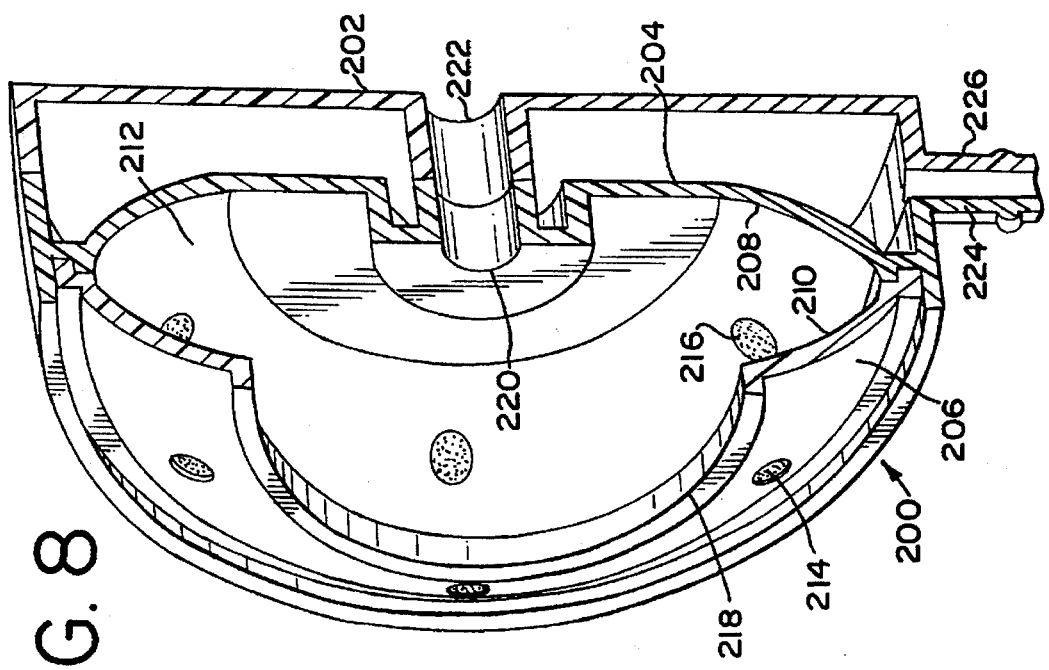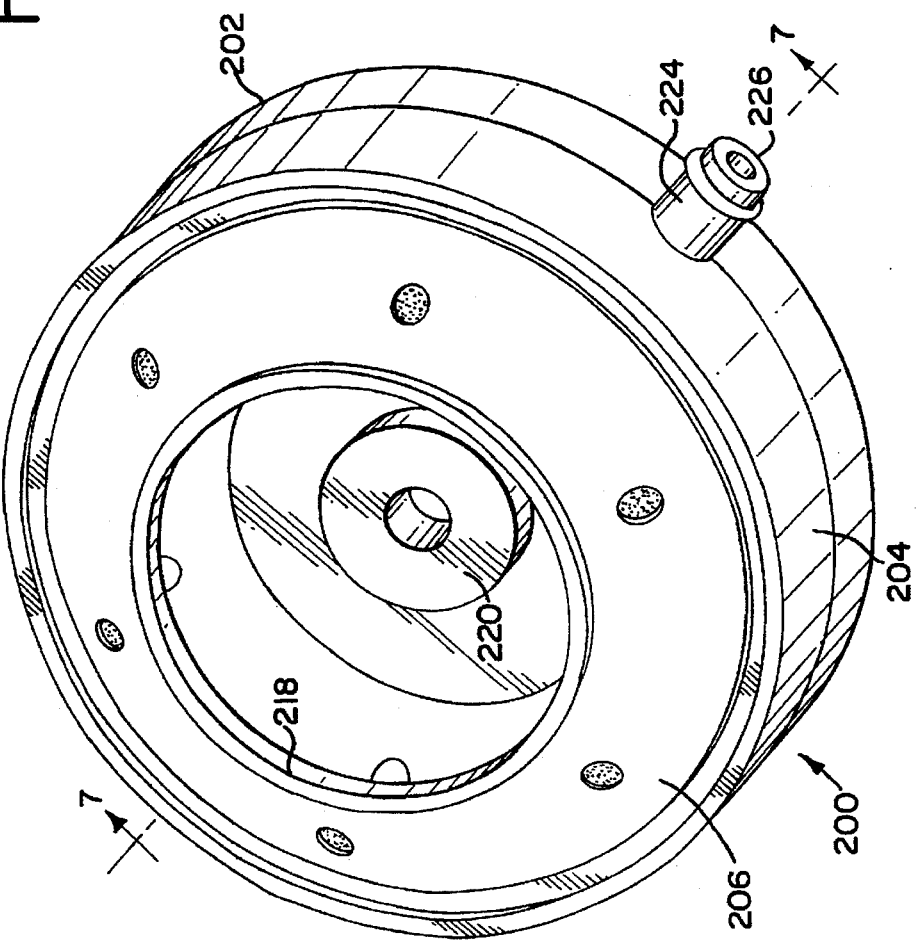

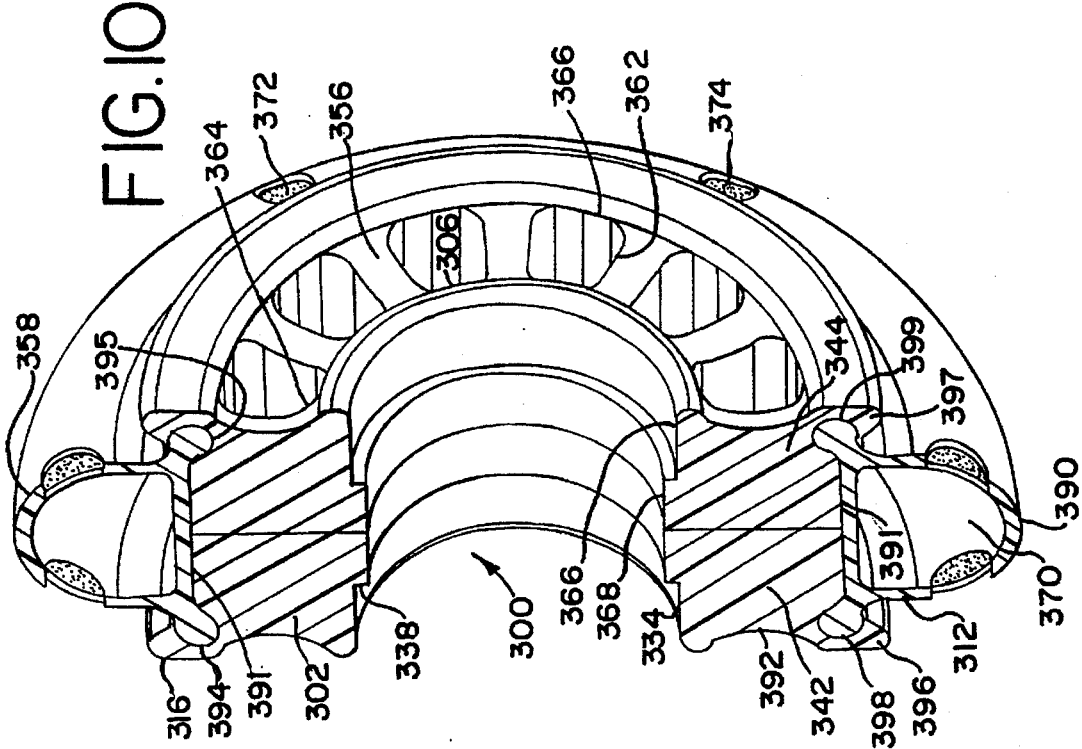
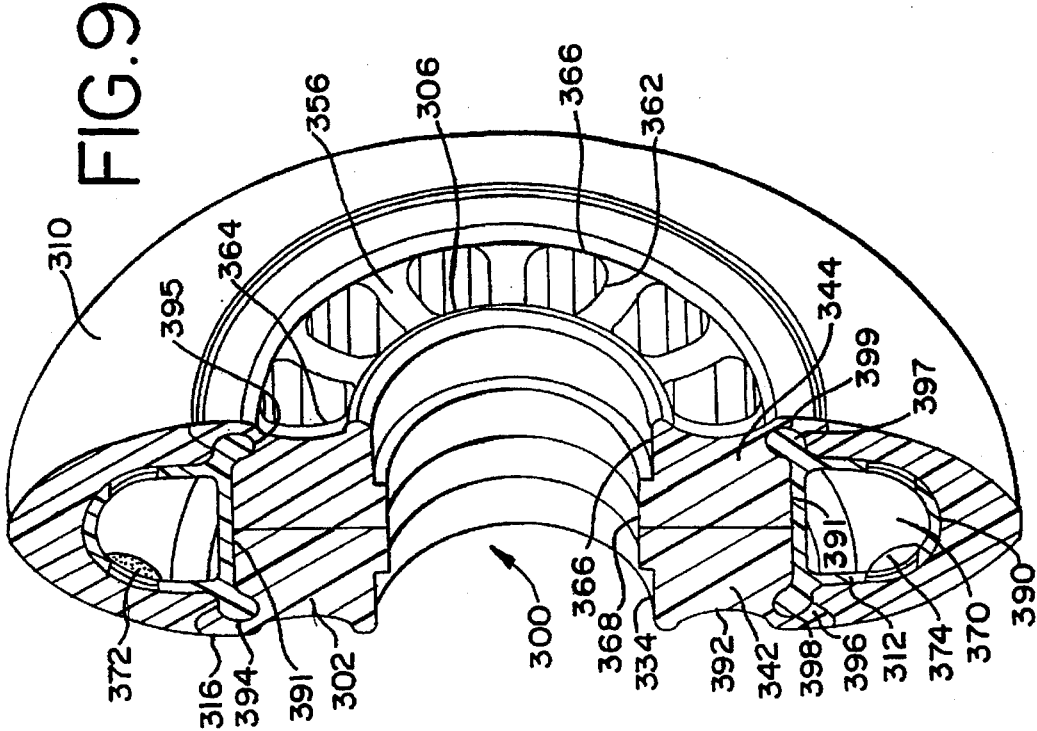

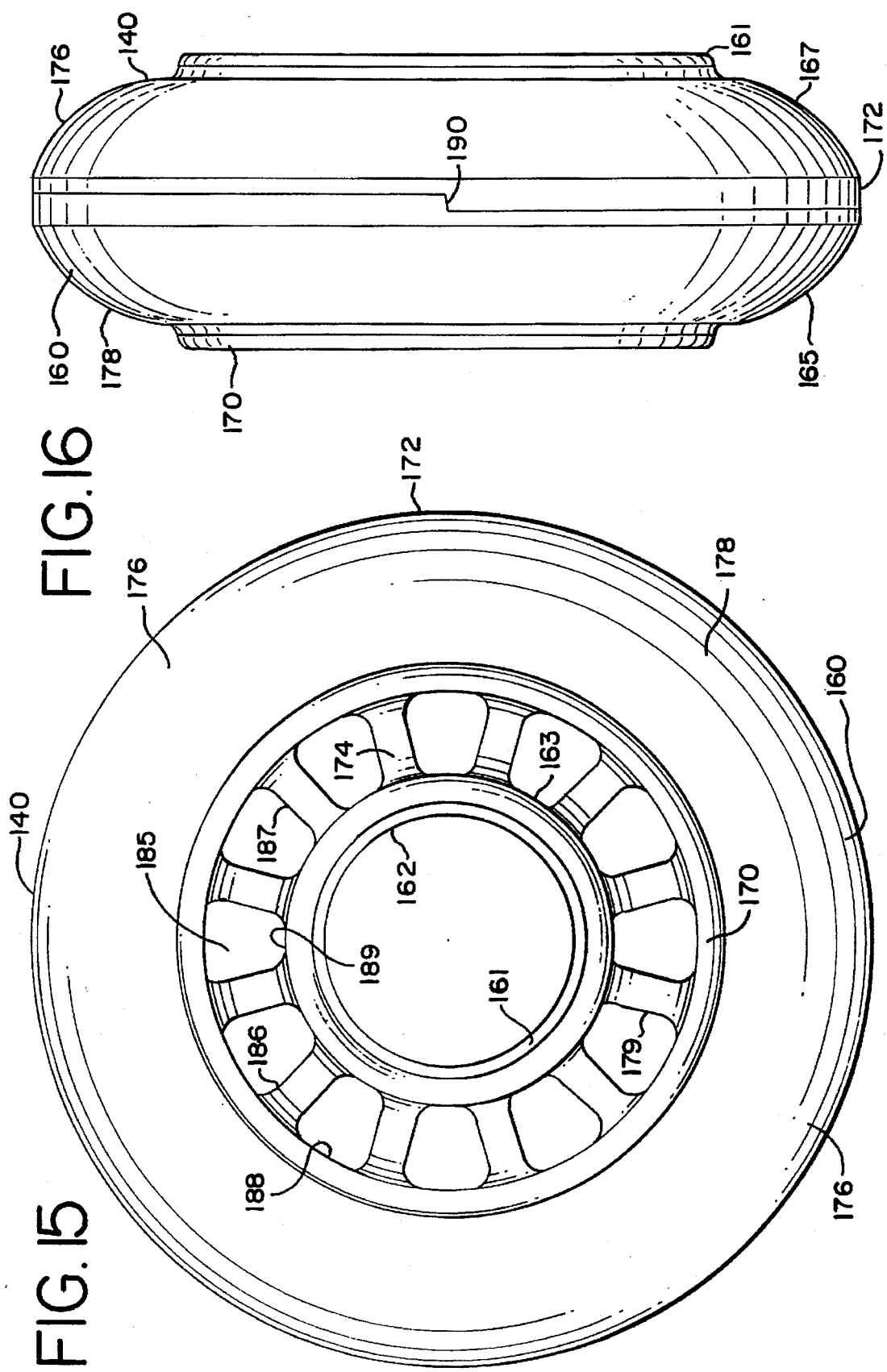

HIGH PERFORMANCE IN-LINE ROLLER SKATE WHEELS

RELATED APPLICATION

This application is a continuation-in-part of pending application of Charles J. Lee for High Performance In-Line Roller Skate Wheels, Ser. No. 08/411,327, filed Mar. 27, 1995, in Group Art Unit 3106.

BACKGROUND OF THE INVENTION

This invention pertains to roller skates and, more particularly, to in-line roller skate wheels.

Before the popularity of in-line roller skating, roller skaters typically used quad-type roller skates with a pair of wheels or rollers at the front near the toe and a pair of wheels at the back near the heel. Quad-type pairs of wheels or rollers were usually mounted on trucks or casters upon frames which were attached to shoes or boots. The wheels were often made of metal. The popularity of quad-type roller skates has been surpassed by in-line roller skates.

In-line or linear roller skates utilize two or more wheels positioned to rotate within a common plane along a straight line. To many skaters, in-line roller skates have a feel and behavior often associated with ice skates, i.e. similar body movements are utilized to operate both ice skates and in-line roller skates. In-line roller skates have become increasingly popular with ice skaters as a training tool for off season and for use on sidewalks, driveways and streets. In-line roller skating today has a become a popular recreational activity for sports enthusiasts of all ages.

Conventional in-line roller skates typically have two roller bearing, i.e. left and right roller bearings, mounted on an 8 mm axle. Conventional in-line bearings have a diameter of 22 mm and are relatively heavy, weighing about 12–15 grams each with each bearing having a width of 7 mm. Conventional in-line bearings have a combined bearing weight of 24–30 grams and a combined bearing width of 14 mm. Conventional in-line roller skates also have large hubs and rims and 12 spokes. Conventional hubs and rims generally each have a width of 24–25 mm. Conventional hubs have heavy cores weighing 30–40 grams with the entire wheel weighing 72–100 grams. Conventional rims are small with a diameter of 38–40 mm. The ratio of conventional rim width to conventional bearing width is 1.71–1.78. Conventional in-line roller skate also have low to moderate strength, soft tires with a tensile strength of 8,000–10,000 psi and a hardness of 76–85 durometers on the A Scale. Conventional in-line skate tires have diameters ranging from 47–82 mm.

It is desirable to provide an improved in-line roller skate for greater speed, maneuverability and control.

SUMMARY OF THE INVENTION

Improved high performance in-line roller skates are provided for greater speed, maneuverability and control. The faster in-line roller skates are impressive to use, durable and attractive. Advantageously, the high performance in-line roller skates are efficient, effective, and economical. Desirably, the high performance in-line roller skates can be readily produced and have superb marketing and advertising appeal.

To this end, the improved quality in-line roller skates each haves a set of high speed, light weight tandem wheels that are positioned generally in alignment with each other. Each of the wheels can have a single, large, light weight bearing that weighs substantially less than 30 grams. The large impact-resistant bearing can have an outside diameter that is greater that 22 mm, can be used at high dynamic temperatures for extended periods of time, and preferably has a relatively long wear life.

Each wheel also has a light weight fiber-reinforced core to reduce core flex and attain greater skating speed. The core can include: a high performance hub, an inner rim, a first set of elongated inner spokes which connect the hub to the inner rim, an outer rim, and a second set of short outer mini-spokes which connect the inner and outer rims. The hub securely receives the bearing and can weigh substantially less than 72 grams, preferably 10–50 grams. To further enhance performance, a high strength tire is mounted on the bearing. The high strength tire can have a width greater than the maximum width of the bearing and can have a tensile strength substantially greater than 10,000 psi. Advantageously, the outer spokes and outer rim can cooperate with each other to provide a mechanical trap to securely connect the core to the tire. The mechanical trap can be solid or hollow.

In one form, the hub can have a rim with a diameter greater than 40 mm and the rim has a width substantially less than the maximum width or thickness of the tire. The hub can have a narrow width that is substantially less than 25 mm. The outer side of the hub can have a raised shoulder which seats against and prevents outward movement of the bearing. If desired, the inner side of the hub can also have a raised shoulder. The tire can have threads and can have a hardness substantially greater than 85 durometers on the A scale to increase longevity and wear. Each tire can also have a wear indicator. Each wheel can also have at least one retainer or retaining ring which fits into one or more grooves in the core to secure the bearing. Pronation adjustable wheels can also be used for various types of skating. Each wheel can further have 8–12 inner spokes and 8–12 outer mini-spokes. In one embodiment, the spokes and mini-spokes are solid. For lighter weight wheels, the spokes, mini-spokes, and/or rims can be hollow.

The high performance in-line roller skate wheels are light weight and weigh substantially less than comparable similar size conventional in-line roller skate wheels to attain greater speed, flexibility, and control, as well as a better feel and grip of the pavement or other skating surface. In the preferred form, the ratio of the total wheel weight (expressed in grams) to the maximum wheel diameter (expressed in mm) is less than 1 (i.e. <1:1). Preferably, the ratio of the total wheel weight (expressed in grams) to the maximum wheel diameter (expressed in mm) ranges from 0.4:1 to 0.9:1, and most preferably ranges from 0.69:1 to 0.75:1 for best results.

The high performance core of the in-line roller skate wheel can comprise symmetrical core sections. In the illustrative embodiments the core sections comprise a front core section and a back core section. Desirably, th elight weight core has an annular hollow shell connecting the inner rim to the outer rim (outer edge). The exterior surface of the hollow shell provides a tire-engaging surface with greater surface area to receive and engage the tire than conventional in-line skate wheels, in order to provide a better connection to the tire so that the in-line roller skate can withstand higher impacts and dynamic loads.

The core sections can be rotatively secured by interlocking circumferential fingers or joints which can comprise protrusions and recesses to minimize separation of the core sections during shear loads and impact. The core sections can also be welded together, such as by ultra sonic welding. In an illustrative embodiment, raised portions or protuberances are located on the inner surfaces of the shell to facilitate welding. Other connecting means can also be used to secure the core sections to each other.

In one embodiment, the spokes are separated by diverging openings and have sides with flat or planar portions. In another embodiment, the spokes are separated by circular openings and have semi-circular concave sides.

A more detailed explanation of the invention is provided in the following description and claims taken in conjunction with the accompanying drawings.

BRIEF DESCRIPTION OF THE DRAWINGS

FIG. 7 is a perspective view of the core as viewed from the groove (front) side;

FIG. 8 is an enlarged cross-sectional view of part of a hollow core and tire;

FIG. 15 is a front view of the core of FIG. 13;

FIG. 16 is a side view of the core of FIG. 13;

DETAILED DESCRIPTION OF THE PREFERRED EMBODIMENTS

Figure 1:
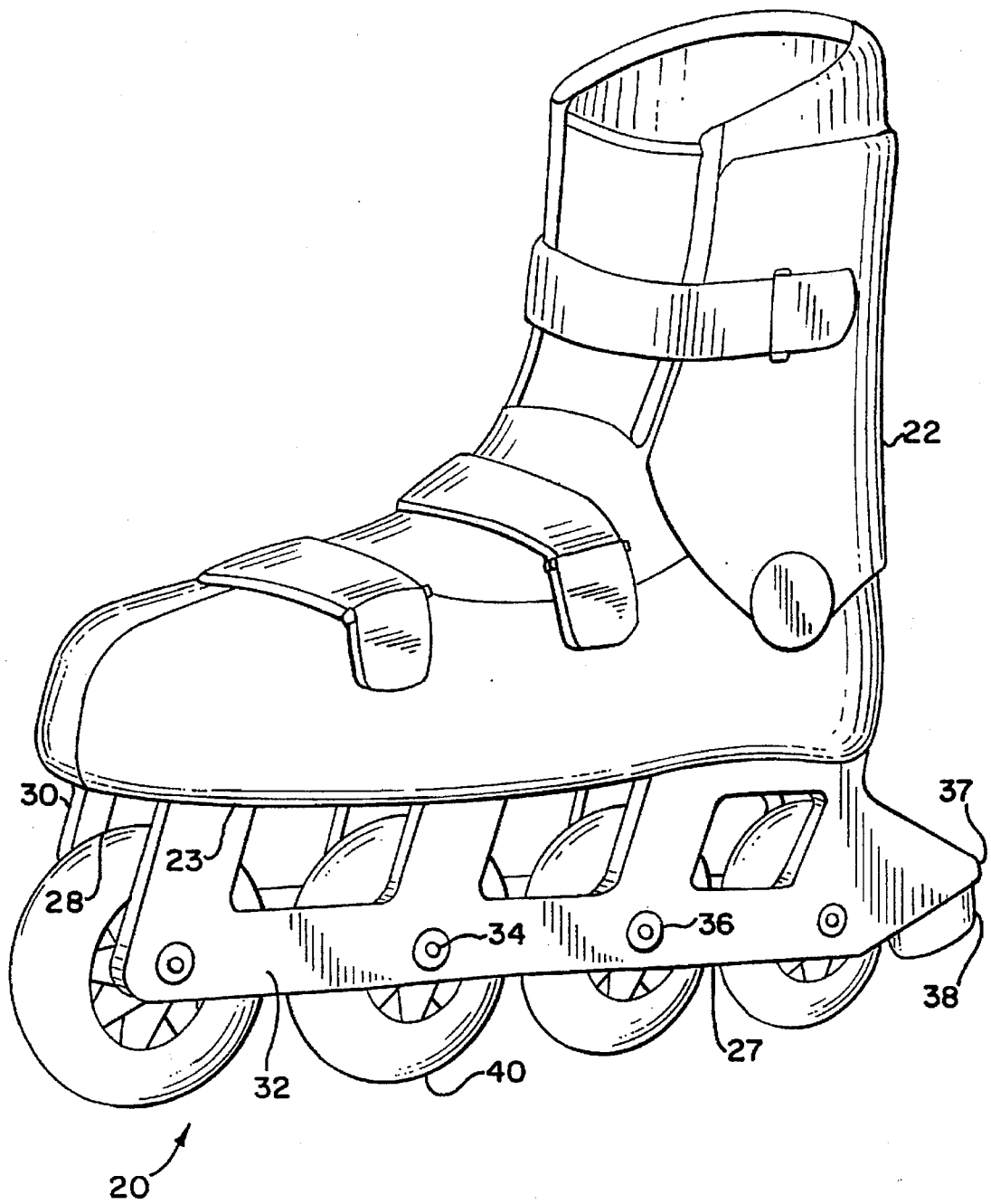
FIG. 1 is a perspective view of an in-line roller skate in accordance with principles of the present invention.
Figure 2:
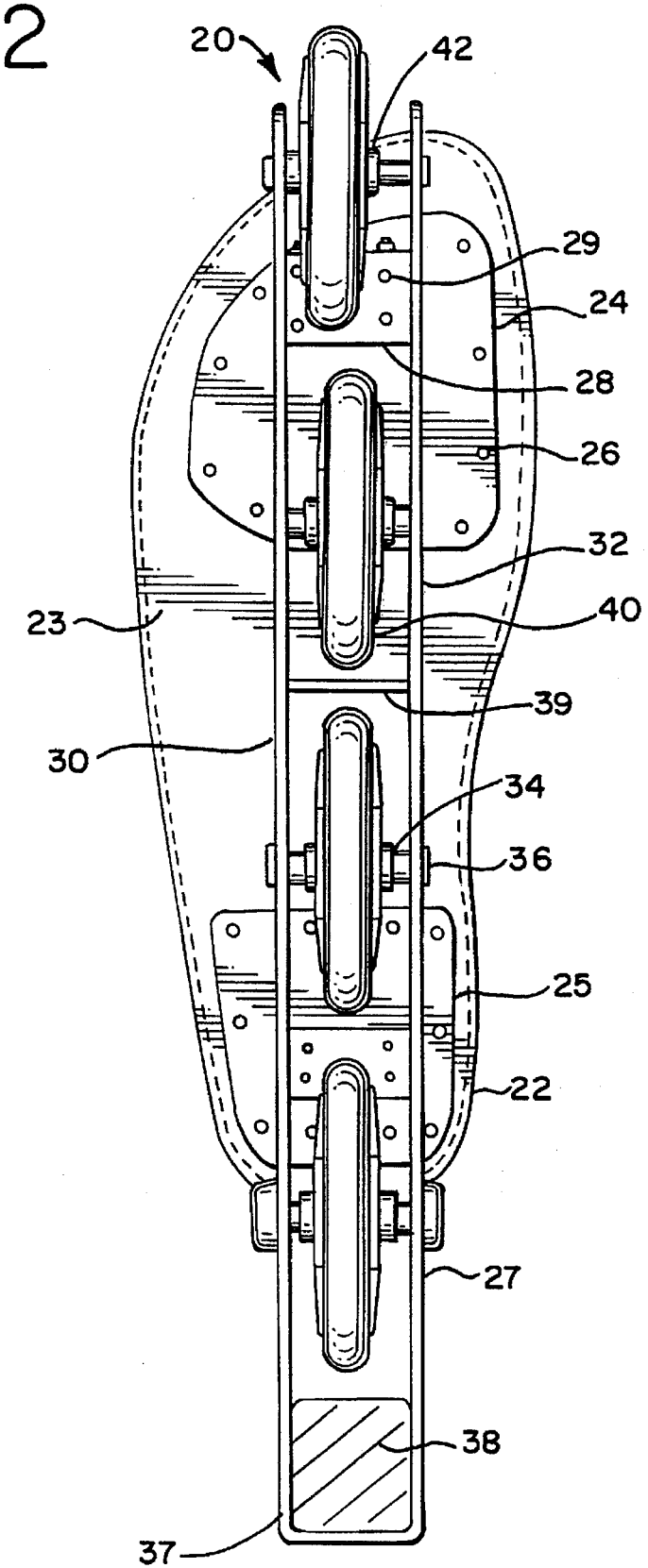
FIG. 2 is a bottom view of the in-line roller skate with one of the wheels adjusted to an offset position.

FIGS. 1 and 2 of the drawings illustrate a high performance in-line roller skate 20. The roller skate has a boot 22 with a sole 23. The boot can have laces or straps. The sole can have toe and heel support plates 24 and 25 (FIG. 2) which can be fastened to the sole by rivets 26 or screws or otherwise secured thereto. The boot provides protection and support to the foot and ankle of the skater. A wheel-supporting bracket skate frame providing a chassis 27 is mounted or otherwise attached to the sole of the boot. The chassis can be channel-shaped with upper horizontal intermediate sole-connecting plate sections 28 which can be fastened by rivets 29 or bolts or otherwise secured to the sole or toe and heel support plates of the sole. The chassis can have a pair of vertical sides 30 and 32 which can comprise flanges or rails that extend downwardly from the plate sections. The frame can be made of metal or plastic, e.g. fiberglass reinforced nylon.

An array of aliquotly 2–6 spaced axles 34 or shafts are mounted transversely across the sides of the chassis. The axles can comprise rivets or bolts secured by locknuts 36. The axles rotatably support a series, set or array of 2–6 high performance, light weight, narrow wheels 40. Each of the axles has a shaft diameter of at least 9 mm for greater bending and shear strength.

The chassis can also be connected to a separate or integral U-shaped rear frame section 37 with a brake assembly or rear brake 38 fastened thereto. One or more transverse reinforcing ribs 39 can extend between and connect the sides of the chassis between the wheels.

The high performance, light weight in-line skate wheels 40 are longitudinally aligned in registration with each other in a single row in a straight line in the direction of movement of the skater. Adjustable fasteners 42 can be attached to the axle to accommodate pronation adjustable wheels, i.e. for lateral adjustment and offset of the wheels. The wheels can also be adjusted for angular mounting on the axles to enable the skater to attain improved traction during turns. Each of the light weight thinner wheels 40 weighs substantially less than 72–100 grams and preferably weighs 25–40 grams to substantially minimize axial torque, torsion and skewing.

In order to reduce internal bearing surface friction, each wheel has only one bearing comprising a single, large, light weight bearing 50 (FIG. 3) which is symmetrically located in the middle of the wheel. The bearing has an inner bearing surface 52 secured to one of the axles and has an outer bearing surface 54 with an outside diameter ranging from 24–26 mm. In the preferred embodiment, the light weight bearing weighs 4–12 grams and the maximum width of the bearing width is 2–7 mm.

Each wheel also includes a small, light weight, fiber-reinforced core 60 to reduce core flex and attain greater skating speed. The core can be molded in one or more parts from nylon reinforced with Kevlar polyaramid fiber. In some circumstances, it may be desirable that the core be molded of reinforced polyurethane or other moldable polymers, or reinforced carbon fibers or other types of fibers or that the bearing be integrally molded to the core. The core includes a high performance hub 61. The hub comprises an annular central portion of the core and has an inner hub surface 62 and an outer hub surface 63.

The inner (inside) surface 62 of the hub provides a bearing seat which is press fit or secured by a friction fit to the bearing. The inside surface of the hub also has a circular annular groove 64 which receives a retaining ring 66 (FIG. 3), snap ring or retainer which annularly engages and secures the outer bearing surface of the bearing to the hub. If desired, more than one ring and groove can be used. Shims can also be used. The outer side of the hub can also have at least one raised shoulder 68 (FIG. 5) which seats against and prevents outward lateral movement of the bearing. The shoulder can comprise a ribbed or solid shoulder.

Figure 6:
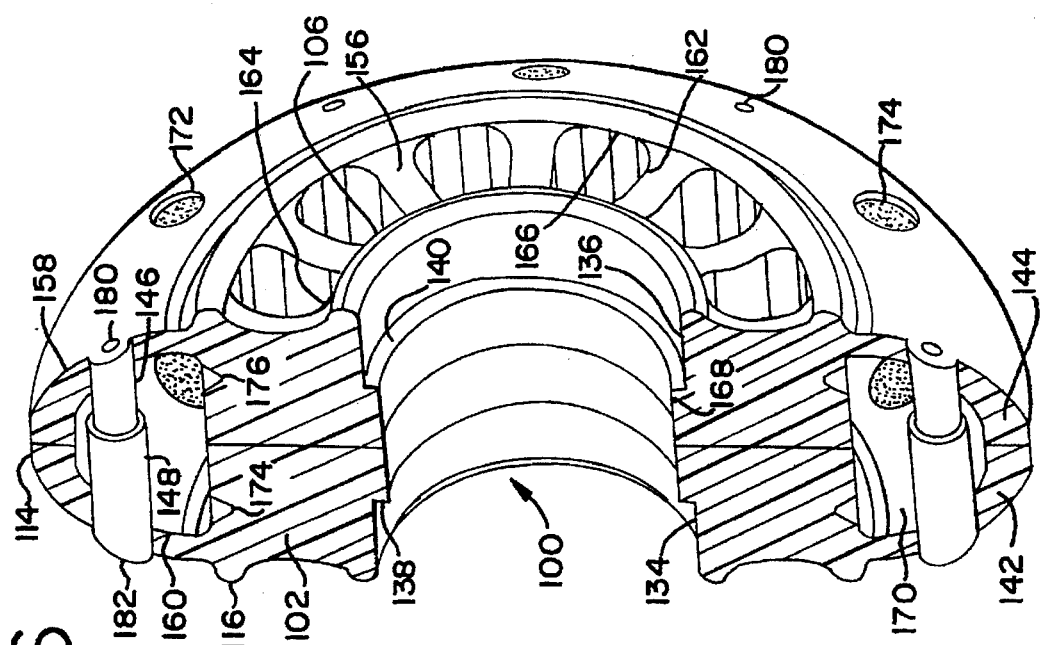
FIG. 6 is a perspective view of the core as viewed from the shoulder (back) side.

As shown in FIGS. 6 and 7, the core 60 has: a high performance hub 61; an inner flanged rim 70 that is positioned about the hub; an outer rim 72 that is positioned about the inner rim; a first set of 8–12 elongated inner spokes 74, arms or ribs, which extend radially between and connect the hub to the inner rim; and a second set of 8–12 outer spokes 76 (mini-spokes), arms or ribs, which extend radially between and connect the inner and outer rims. The outer spokes and outer rim cooperate with each other to provide a mechanical trap to innerlockingly engage and secure a tire

Figures 3, 4:
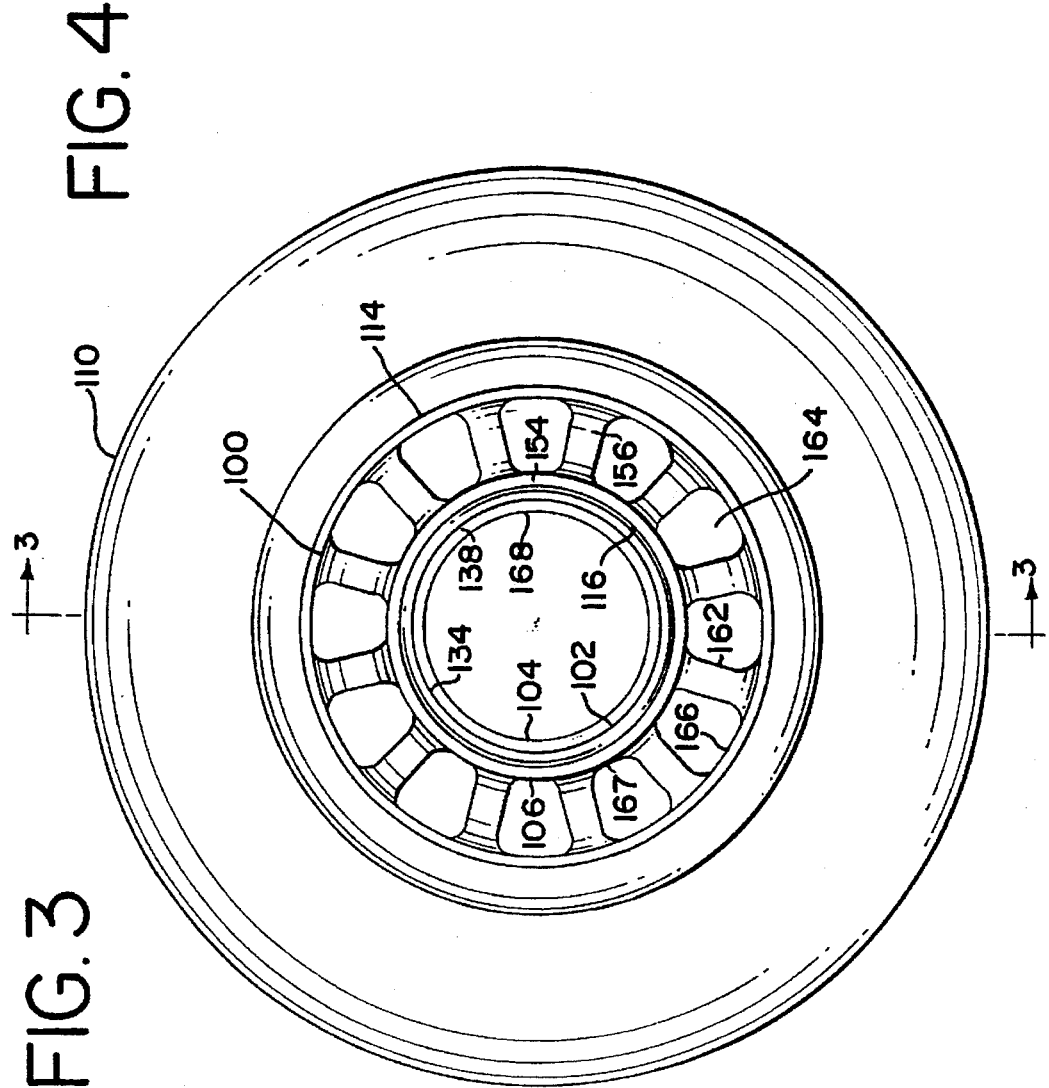
FIG. 3 is a front view of an in-line roller skate wheel.
FIG. 4 is a cross-sectional view of the in-line roller skate wheel taken substantially along line 4—4 of FIG. 3.
Figure 5:
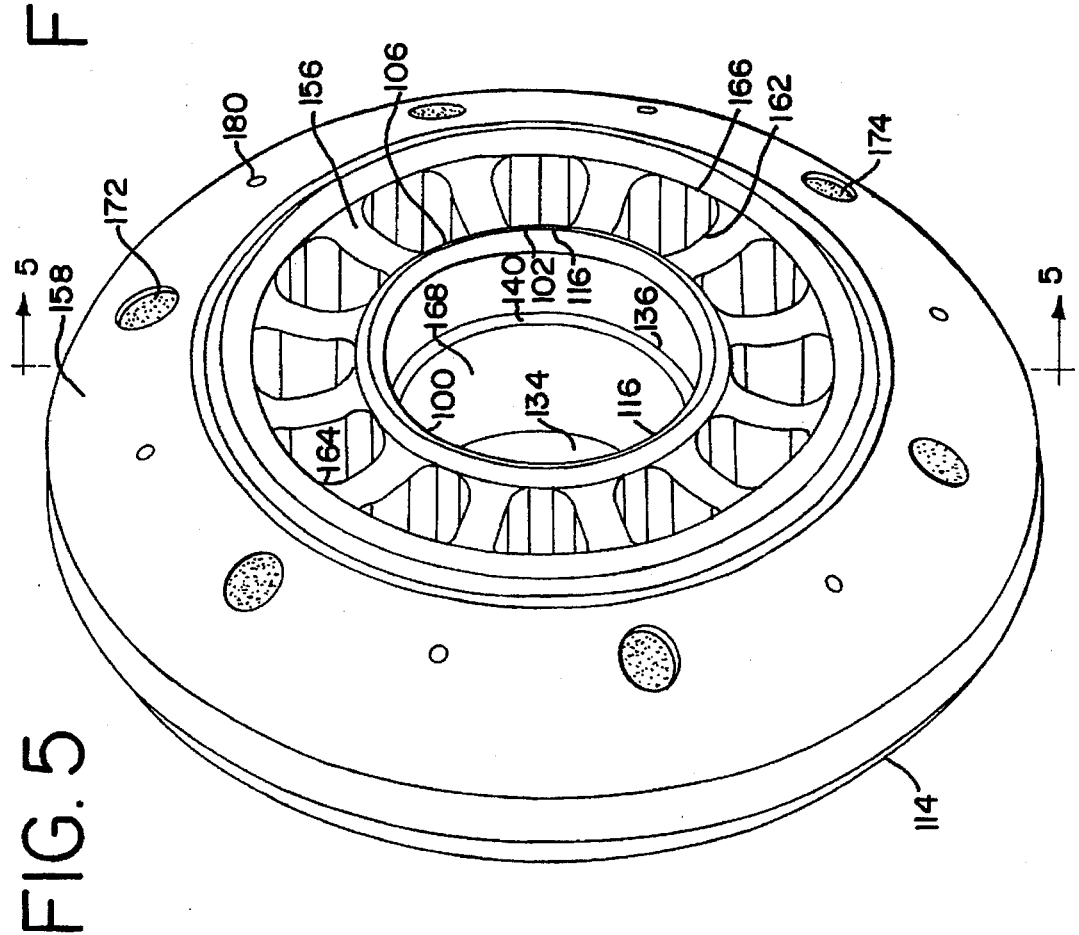
FIG. 5 is an enlarged cross-sectional view of part of a solid core and tire.

80 (FIGS. 3–5). The inner and outer spokes are solid and radially aligned with each other as shown in FIGS. 4–7. The spokes reduce the overall weight of the wheel. As shown in FIG. 8, for further reduced weight and more speed, the hub 61', spokes 74', and 76', inner rim 70', outer rim 72', and/or mechanical trap can be hollow.

The width of the inner rim can be at least as small as the maximum bearing width. The ratio of the inner rim width to the bearing width is less than or equal to one, i.e. $\leq 1$. In one embodiment, the width of the inner rim is 2–7 mm and the lateral width of the hub (core) is 4–13 mm. The ratio of the hub width to the inner rim width can be $\geq 1$, and preferably 1.81.

For greater stability and ride quality and to better enable the tire to hold the surface of the pavement, as well as to minimize undersirable tilting, skewing, and tread squirm, the ratio of the vertical spacing between the outside diameter (outer thread surface) of the tire and the outer rim to the lateral spacing between the lateral outer side of the tire and the outer rim ranges from 0.3 to 0.8.

Figure 9:
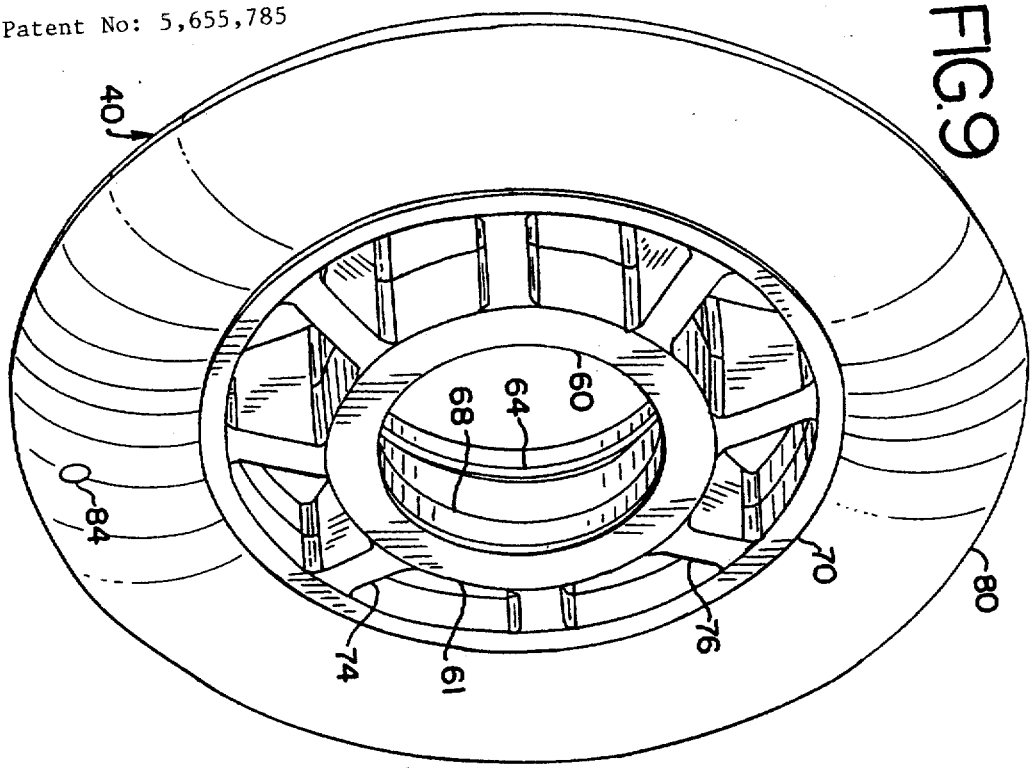
FIG. 9 is a perspective view of the in-line skate wheel as viewed from the shoulder (back) side.
Figure 10:
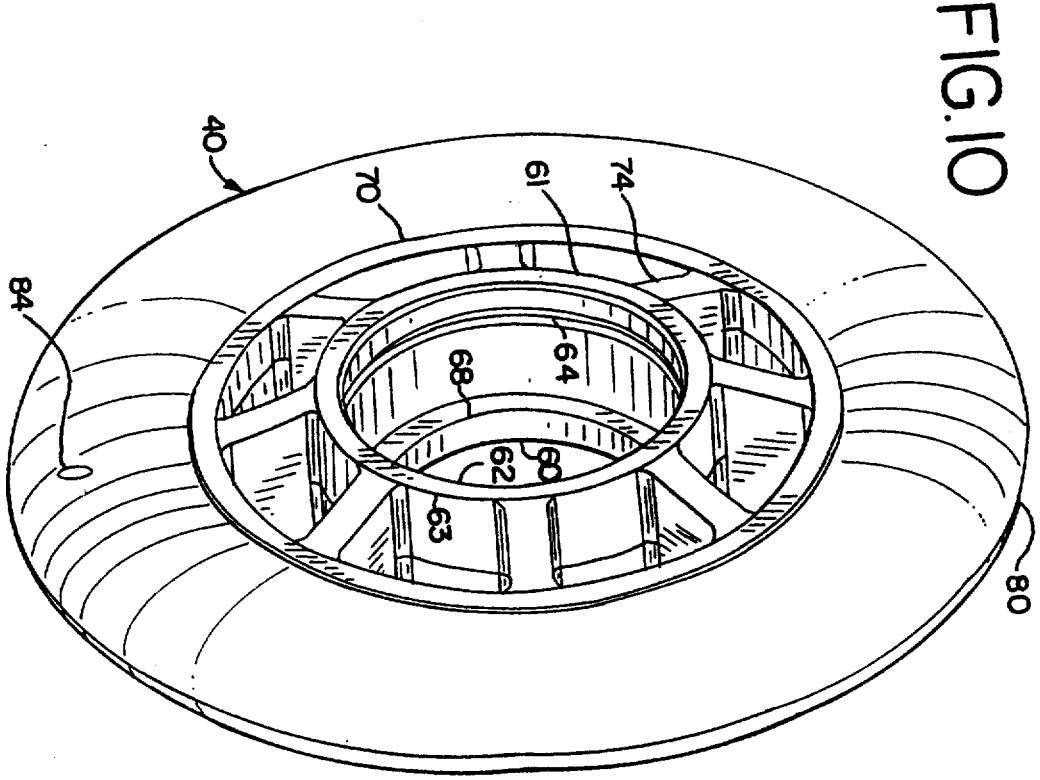
FIG. 10 is a perspective view of the in-line skate wheel as viewed from the groove (front) side.
Figure 11:
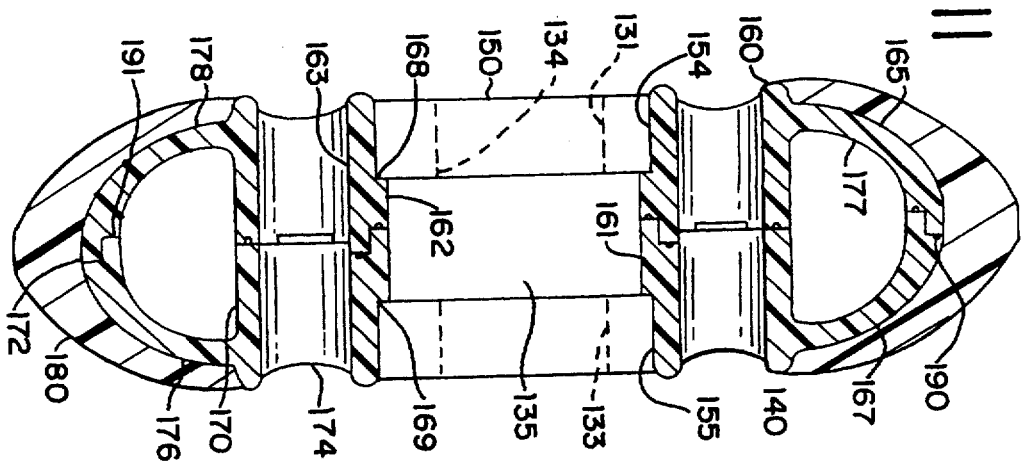
Figure 12:
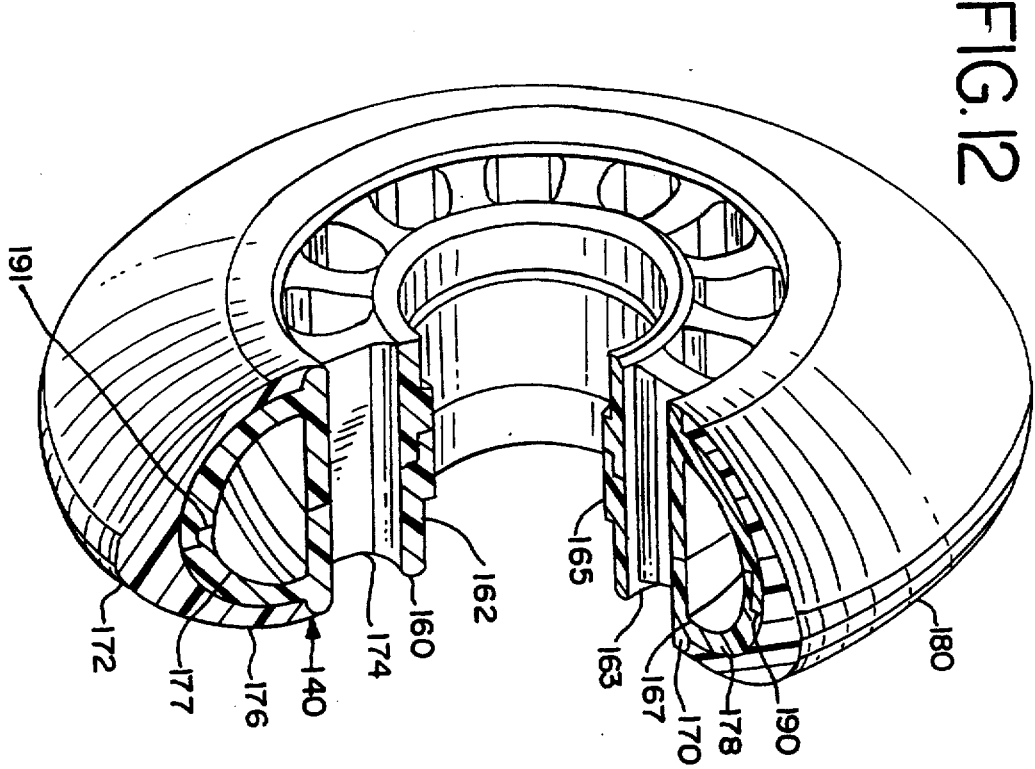

The tire 80 (FIGS. 3, 9 and 10) annularly surrounds and is secured to the hub about the rims. In one embodiment, the tire preferably comprises a high strength solid non-pneumatic tire with a tensile strength ranging form 26,000–40,000 psi and a hardness ranging from 60–85 durometers on the D Scale. The thickness (width) of the tire can be at least as great as the maximum width of the bearing. The maximum tire thickness can be greater than the maximum transverse span or width of the inner rim, as well as the outer rim, i.e. $\geq 1$. The ratio of the inner rim width to the thickness (width) of the tire can range from 0.6 to 0.9. Furthermore, the hub width may not be the same as the inner rim width. The ratio of the hub width to the inner rim width can be >1. In one embodiment, the upper portion of the tire adjacent the outer rim and mechanical trap is convex and flared. The profile of the tire can be greater than 180 degrees and preferably ranges from 210–340 degrees, most preferably 300–330 degrees. The tire can also have threads 82 (FIG. 8) on its outer surface. The tire can be made of thermosetting or thermoplastic polyurethane. In some circumstances, it may be desirable to mold the tire out of other elastomeric materials or that the tire be semi-solid, hollow or pneumatic with air pockets or voids.

In order to monitor tire wear, each tire can have at least one wear marker 84 (FIGS. 3, 9 and 10) bonded or otherwise secured thereto. The wear marker provides a wear indicator to indicate and view the wear of the tire. Worn tires should be replaced for peak performance. The wear marker can be in the shape of a bubble or tear drop or can be an indented circle.

High performance, light weight, plastic, in-line skate wheels 140 of the type shown in FIG. 11–16 can be used in high performance, in-line roller skates 20 (FIGS. 1 and 2) instead of the previously described in-line skate wheels 40. The light weight in-line skate wheels 140 of FIGS. 11–16 are structurally and functional similar to in-line skate wheels 40 except as explained below. For ease of understanding, similar parts have been given similar part numbers except in the 100 series (i.e. increased by 100) such as in-line skate wheels 140, core 160, tire 180, etc.

Wheels 140 and 40 can be injection molded or cast molded. Wheels 140 and 40 can also be made in different sizes and weights depending on the age, height, and weight of the skater (customer) and the intended use of the in-line roller skates. Some of the many size that wheels 140 and 40 can be molded are the following wheel diameters (maximum outside diameter) expressed in mm: 47, 54, 57, 60, 64, 65, 70, 72, 75.5, 76, 77.5, 80 and 82.

Each wheel 140 preferably weigh 30–60 grams to minimize axial torque, torsion and skewing. The ratio of the total weight of wheel 140 (in grams) to the maximum outside diameter of the wheel 140 (in mm) is <1 or <1:1 preferably ranges from 0.4:1 to 0.9:1 and most preferably ranges for 0.69:1 to 0.75:1 for best results. For example a wheel having an outside diameter (OD) of 80 mm would weigh 55–60 grams. This is substantially lighter, about 31%–42% lighter, than prior art 80 mm wheels which usually weigh 80–85 grams. Wheels 140 can be of a light enough weight and density to float in water.

Figure 11:
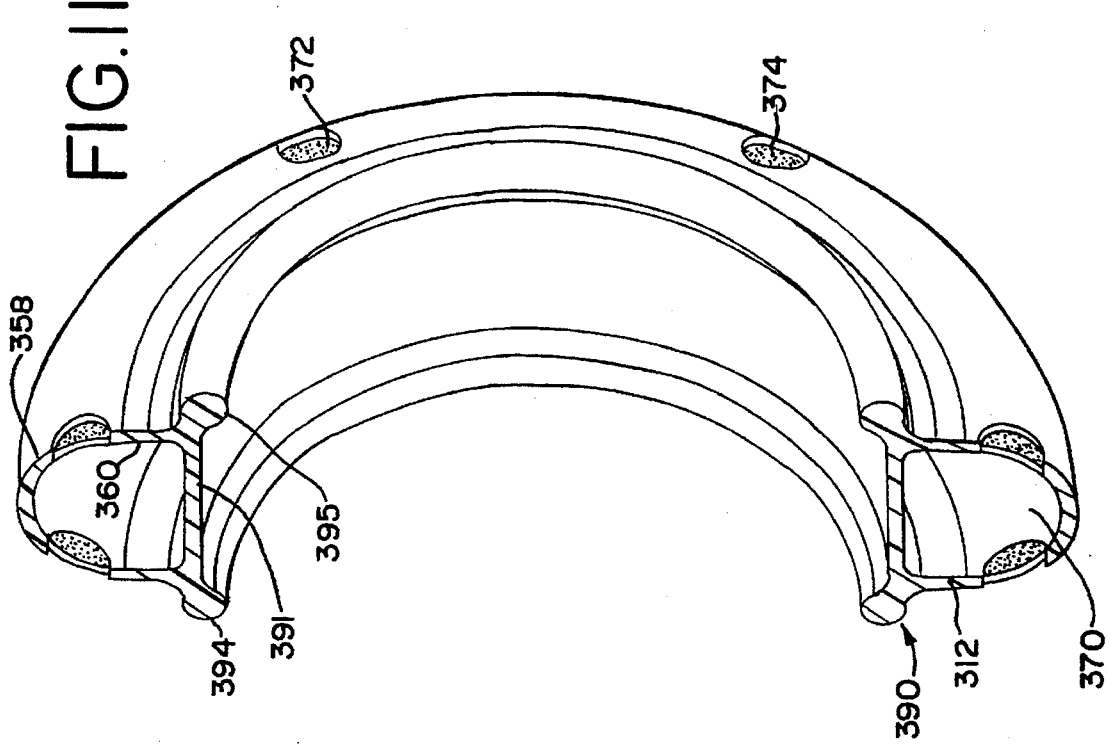
FIG. 11 is a cross-sectional view of another in-line skate wheel in accordance with principles of the present invention.

As discussed previously, the axles in the skate frame (chassis) rotatably support a series, set or array of wheels. As shown in FIG. 11, each axle 134 can comprise an intermediate cylindrical or annular axle portion 135 and smaller diameter, axially opposed, outwardly extending, outer bearing-receiving portions 131 and 133. The axles can be hollow or solid. Bearings 150 and 151 are press fit or otherwise secured to outer axle portions 131 and 133, respectively. Each bearing weighs 4–12 grams and has a maximum width of 2–7 mm. Each bearing can have a diameter of 22 mm. The outer bearing surfaces 154 and 155 of bearings 150 and 151 are press fit or secured by a friction fit to the bearing seats (shoulders) 168 and 169, respectively of the high performance hub 161. The bearings can be a 608 ZZ bearing size with dust shields.

The high performance core 160 weighs 10–50 grams to attain greater skating speed and can be reinforced with fibers, such as polyarmid fibers or carbon fibers for greater strength. The core can comprise symmetrical complementary core sections 165 and 167. In the illustrative embodiment of FIGS. 11–16, the symmetrical cores sections include a front core section 165 and a back core section 167. The core sections 165 and 167 matingly engage and are secured to each other. To this end, the core sections have interlocking circumferential fingers 190 and 191 providing joints comprising protrusions and recesses which snap fittingly engage and securely lock into each other when rotated in the circumferential direction to minimize and prevent separation of the core sections under sheer forces, loads, and impact.

Furthermore, the interior or inner surface 192 (FIG. 13) of the core has inwardly extending welding protuberances comprising raised portions 193–196 to facilitate ultra sonic welding of the core sections. The welding protuberances include: (a) outer semi-circular curved welding protuberances 193 adjacent the beveled or tapered outer rim or edge 172 providing the outside diameter of the core; (b) intermediate curved arcuate welding protuberances 194 adjacent the inner rim 170; (c) inner curved arcuate welding protuberances 195 adjacent the inner surface 162 of the hub 161, which is positioned about the intermediate axle portion 135 (FIG. 11), and (d) radical welding protuberances 196 (FIG. 13) on at least some of the inner spokes 174. In some circumstances, it may be desirable to secure the core sections to each other by other connecting means such as: friction welding, spin welding, chemical bonding, adhesive, glue, tape, screws, or other fasteners.

Figure 12:
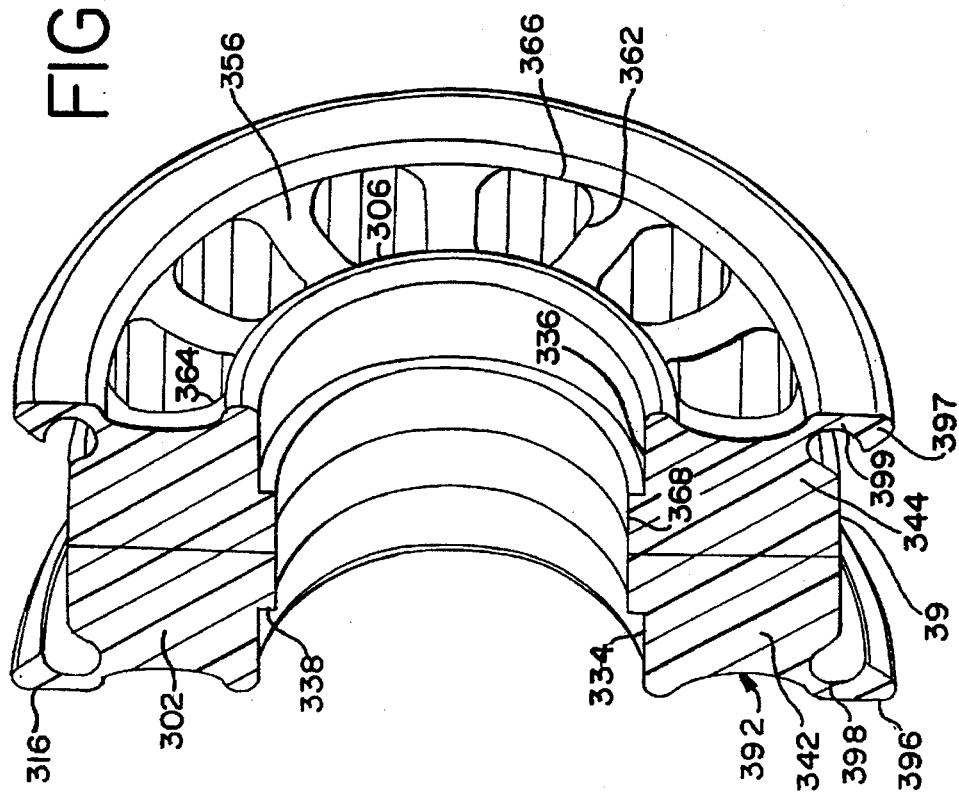
FIG. 12 is a fragmentary perspective view of the in-line skate wheel of FIG. 11 with portion broken away for ease of understanding and clarity.
Figure 14:
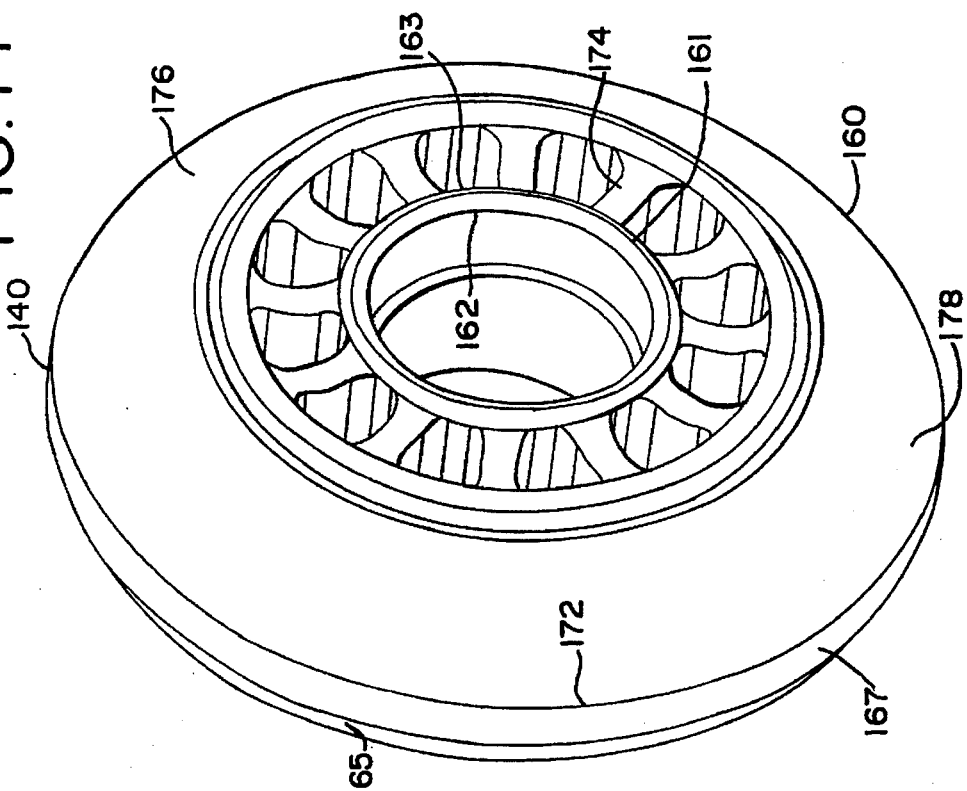
FIG. 14 is a perspective view of the core of FIG. 13.
Figure 13:
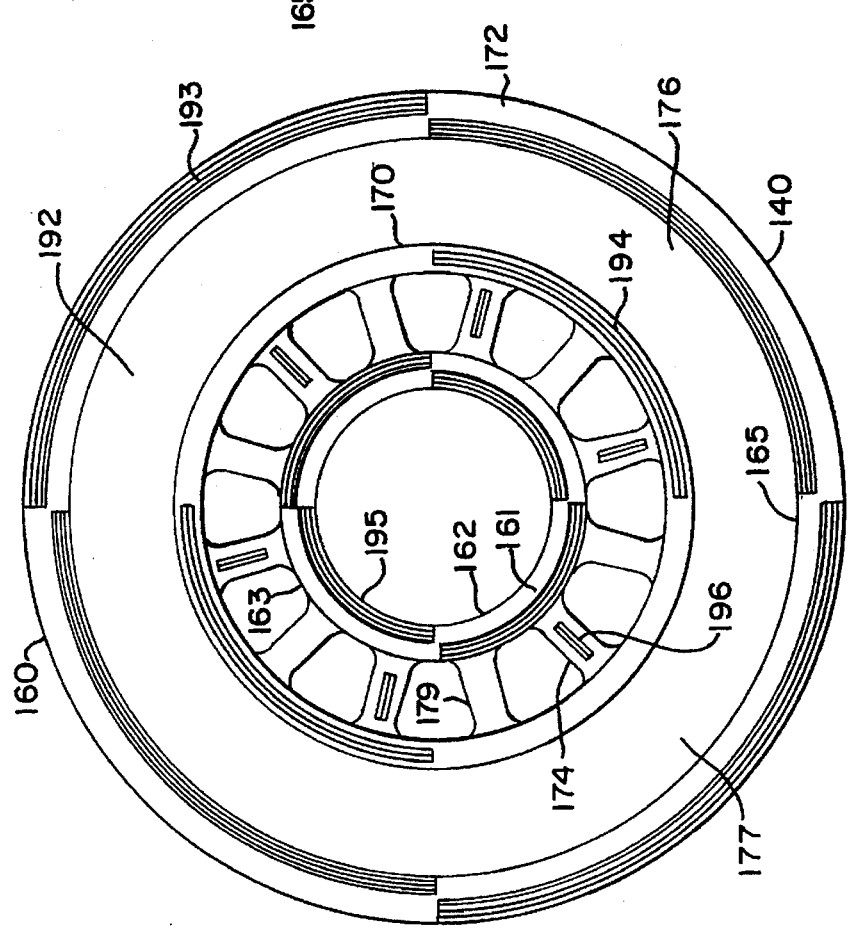
FIG. 13 is an interior view of the core of the in-line skate wheel of FIG. 11.

The radially inner portion of the core 160 comprising the hub 161 and inner spokes 174 can be solid or hollow. The radially outer portion of the core 160 is hollow and comprises an annular tubular shell 176 (FIGS. 11 and 12). The shell provides an annular outer spoke or imperforate ring which integrally extends between and connects the inner rim 170 and the outer rim 172. The outer rim can have a planar or flat exterior surface or face. The inner, inwardly facing surface 177 of the annular hollow shell 176 is curved, arcuate and concave. The outer exterior surface 178 of the shell is curved, arcuate, and convex. The outer shell surface 178 provides a convex, annular, tire-engaging surface. The shell can be reinforced with radial or transverse ribs, discs, or segments. In some circumstances, it may be desirable that the shell be solid or of a different shape or configuration.

The inner spokes 174 radially extend between, connect and reinforce the inner rim 170 and the outer hub surface 163. The sides 179 (FIG. 15) of the inner spokes 174 are generally planar or flat except for the rounded corners adjacent the inner rim 170 and outer hub surface 163. The diverging openings 185 between the inner spokes 174 have radial sides 186 and 187, an elongated curved top or outer portion 188, and a shorter curved bottom or inner portion 189.

The high performance tire 180 (FIGS. 11 and 12) is chemically bonded or otherwise secured to the tire-engaging shell surface 178 and outer rim 172. The tire 180 can be cast or injection molded and made of urethane or polyurethane. The tire can have a hardness of 76–96 durometers on the A scale. The tire is preferably a solid non-pneumatic tire which annularly surrounds the hub and can have a tensile strength less than 10,000 psi. Because of the tire-engaging shell surface 178, mechanical locks are not necessary but can be used if desired. In some circumstances, it may be desirable to mold the tire out of other elastomeric materials or that the tire be semi-solid, hollow or pneumatic with air pockets or voids. The tire can have one or more wear markers as previously described to indicate and view the wear of the tire.

Figure 18:
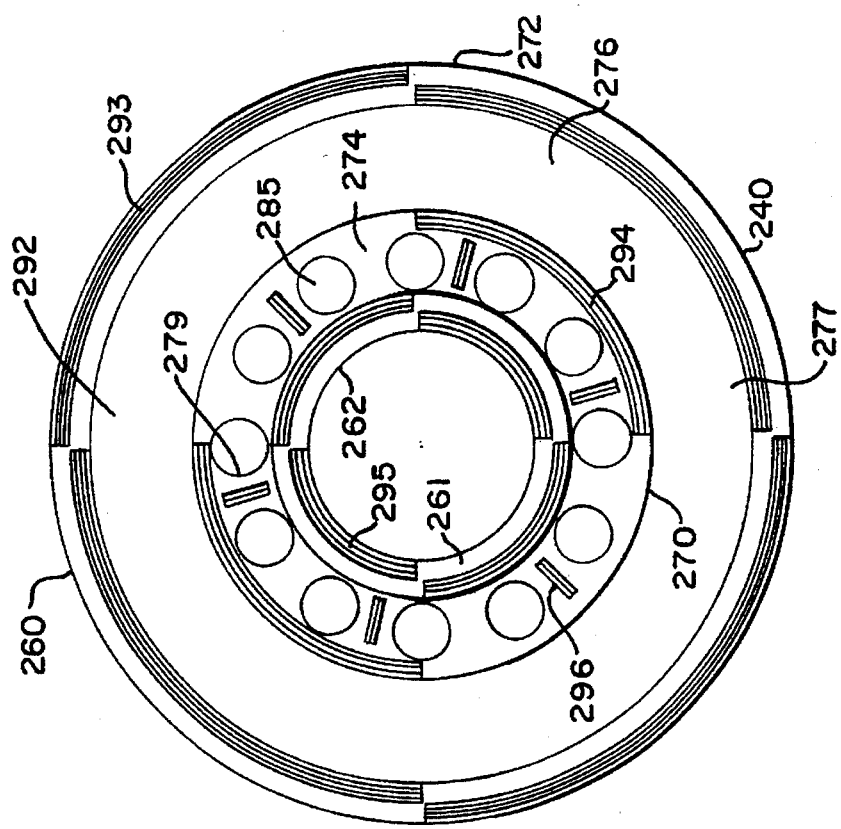
FIG. 18 is an interior view of the core of FIG. 17.
Figure 17:
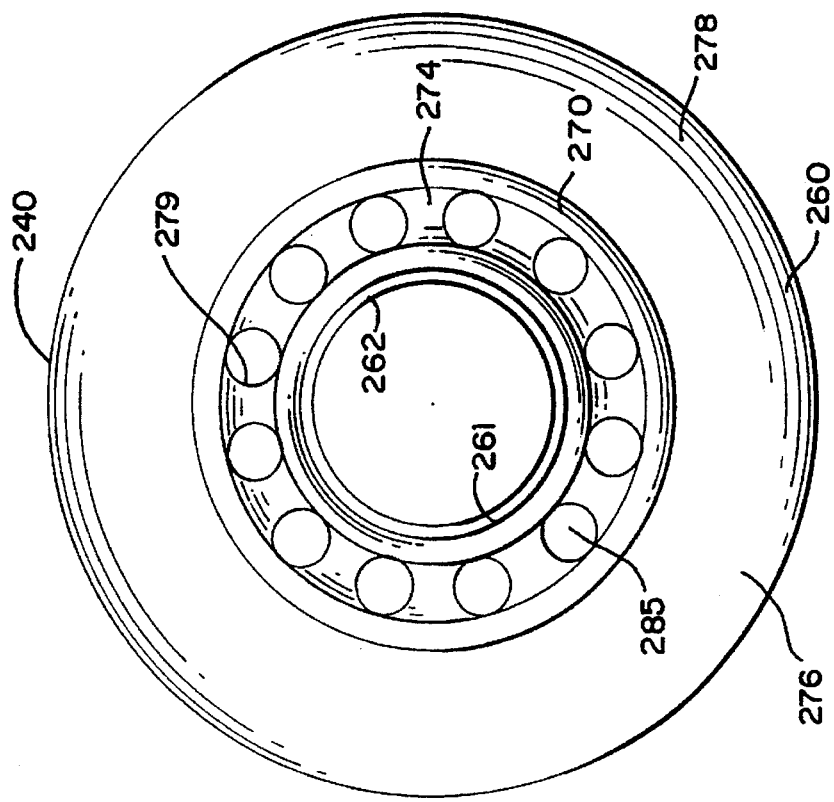
FIG. 17 is a front view of another core for an in-line skate wheel in accordance with principles of the present invention.
Figure 3:
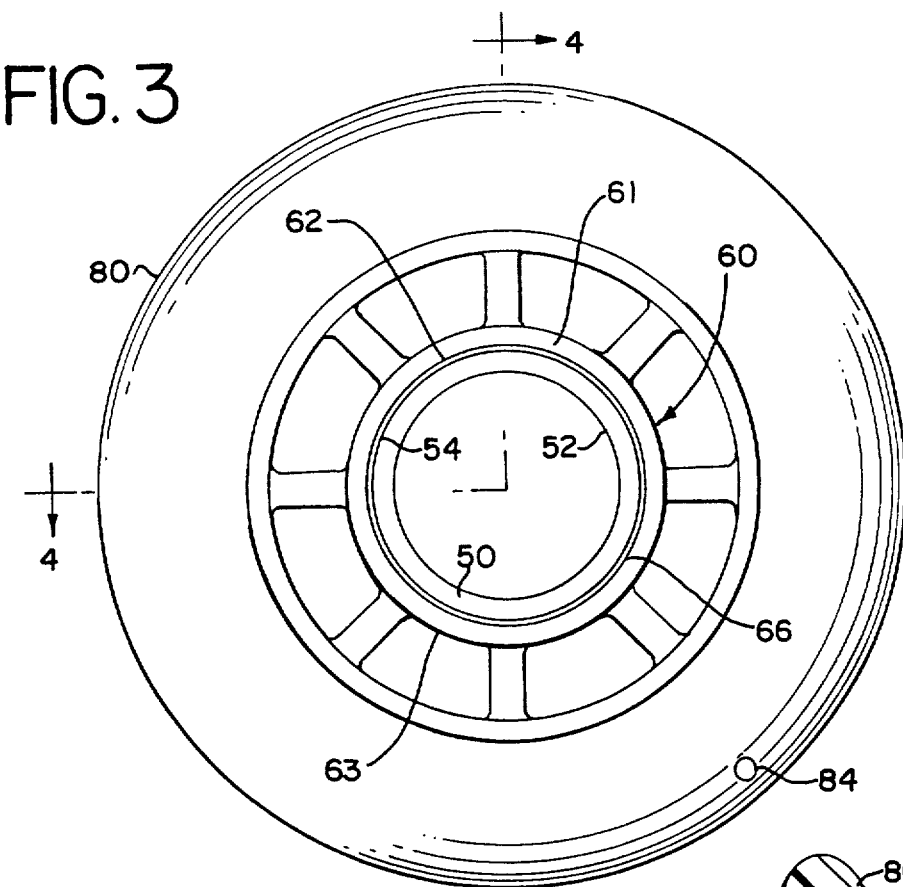
Figure 5:
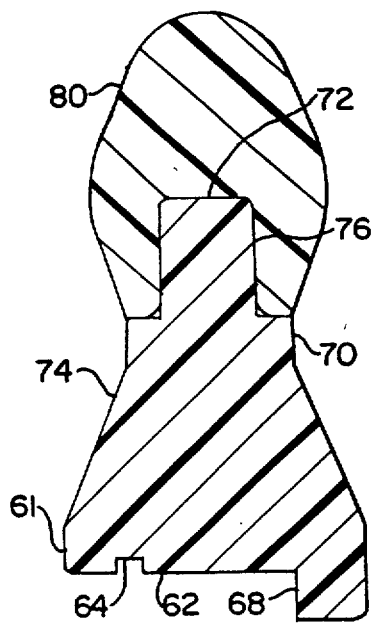
Figure 4:
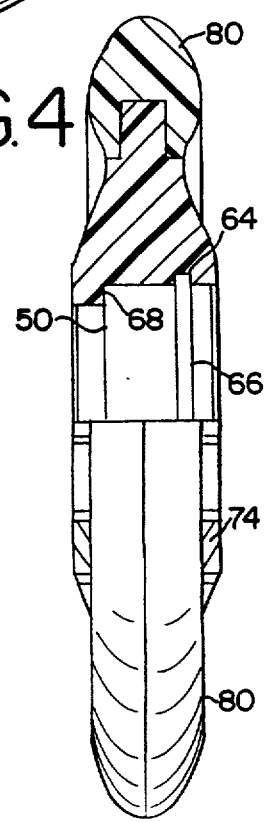

The core 260 of FIGS. 17 and 18 is structurally and functionally similar to the core 160 of FIGS. 11–16, except that the sides 279 of the inner spokes 274 are semi-circular, curved and concave and there are circular openings 285 between the inner spokes 274. For ease of understanding, similar parts have been given similar part numbers except in the 200 series, such as core 260, hub 261, annular hollow shell 276, in-line skate wheel 240, etc.

Among the many advantages of the in-line roller skate are: (1) Superb performance; (2) Excellent speed and maneuverability; (3) Outstanding marketing, advertising, and promotional appeal; (4) Superior quality; (5) Impressive; (6) Cost effective; (7) Simple to assemble; (8) Easy to use; (9) Economical; (10) Attractive; (11) Efficient; (12) Effective; (13) Decreased dynamic and static moment of inertia along the longitudinal, horizontal and vertical axes, i.e. roll, yaw, and pitch; (14) Quicker camber changes; (15) More like ice-skate blades; (16) Reduced mass; and (17) Decreased bearing and tire friction.

Although embodiments of the invention have been shown and described, it is to be understood that various modifications and substitutions, as well as rearrangements of parts, components, and process steps, can be made by those skilled in the art without departing from the novel spirit and scope of this invention.

What is claimed is:

1. An in-line roller skate, comprising:

a boot having a sole;

a wheel-supporting bracket skate frame providing a chassis attached to said sole;

a series of light weight wheels positioned substantially in longitudinal alignment in the direction of movement of the skater;

an array of aliquotly spaced axles providing shafts mounted transversely in said frame for rotatably supporting said wheels, each of said axles comprising an intermediate axle portion and smaller diameter, axially opposed, outer bearing-receiving axle portions extending integrally outwardly of said intermediate axle portion;

each of said light weight wheels having a total weight substantially less than 72 grams for substantially minimizing axial torque and skewing, each of said wheels having a maximum wheel diameter such that the ratio of the total weight of said wheel in grams to the maximum wheel diameter in mm ranges from about 0.4:1 to about 0.9:1, and each of said wheels comprising a pair of bearings mounted on said outer axle portions;

a fiber-reinforced core for enhanced strength and for attaining greater skating speed, said core comprising substantially symmetrical core sections matingly engaged and secured to each other, said core having an annular central portion providing a hub in press-fitting engagement with said bearings, said hub having an outer hub surface providing a rim and an inner hub surface providing an inner side positioned about the intermediate axle portion;

an inner rim positioned about said hub;

a set of spokes comprising elongated inner spokes extending radially between and connecting said outer hub surface to said inner rim;

an outer rim positioned about said inner rim;

an annular hollow shell extending radially between and integrally connecting said inner and outer rims, said annular hollow shell having a concave inner surface and a convex outer tire-engaging surface; and a non-pneumatic tire annularly surrounding said hub and securely engaging said convex outer tire-engaging surface of said annular hollow shell and said outer rim.

2. An in-line roller skate in accordance with claim 1 wherein:

said hub has shoulders providing bearing seats for receiving said bearings;

said hub has a lateral width of about 4–25 mm;

said inner rim comprises a flanged rim and has a width from about 2–25 mm;

the ratio of said inner rim width to the thickness of said tire ranges from about 0.6 to about 1.0;

said spokes have sides with substantially planar portions; and said core defines converging openings between said spokes.

3. An in-line roller skate in accordance with claim 1 wherein:

said wheel weighs about 30–60 grams;

each bearing weighs about 4–12 grams;

each bearing has a width of about 2–7 mm;

said core weighs about 10–50 grams; and said chassis has a rear frame section with a brake assembly.

4. An in-line roller skate in accordance with claim 1 wherein said spokes have semi-circular sides and said core defines substantially circular openings between said spokes.

5. An in-line roller skate in accordance with claim 1 wherein said symmetrical core sections include:

interlocking fingers providing joints for securely joining said symmetrical core sections to substantially prevent separation of said core sections under shear forces; and raised portions for facilitating welding of said core sections, said raised portions including curved protuberances and radial protuberances on at least some of said spokes.

6. An in-line roller skate in accordance with claim 1 wherein said axle is hollow and said ratio ranges from about 0.69:1 to about 0.75:1.

* * * * *

UNITED STATES PATENT AND TRADEMARK OFFICE
CERTIFICATE OF CORRECTION

PATENT NO. : 5,655,785

DATED : August 12, 1997

INVENTOR(S) : Charles J. Lee

It is certified that error appears in the above-identified patent and that said Letters Patent is hereby corrected as shown below:

The Title page should be deleted and substitute therefor the attached Title page.

Drawings:

Delete Drawing sheets 3-12, and substitute therefor the Drawing sheets, consisting of Figs. 3-12, as shown on the attached pages.

Signed and Sealed this

Twenty-sixth Day of May, 1998

Attest:

BRUCE LEHMAN

Attesting Officer

Commissioner of Patents and Trademarks

United States Patent [19]

Lee

[11] Patent Number: 5,655,785
[45] Date of Patent: Aug. 12, 1997

[54] HIGH PERFORMANCE IN-LINE ROLLER SKATE WHEELS

[76] Inventor: Charles J. Lee, 11404 Prescott La., Westchester, Ill. 60154

[21] Appl. No.: 495,921

[22] Filed: Jun. 28, 1995

Related U.S. Application Data

[63] Continuation-in-part of Ser. No. 411,327, Mar. 27, 1995.

[51] Int. Cl.⁶ .................. A63C 17/14; A63C 17/02; A63C 17/22
[52] U.S. Cl. .................. 280/11.22; 301/5.7; 301/5.3
[58] Field of Search .................. 280/11.2, 11.22; 301/5.3, 5.7

[56] References Cited

U.S. PATENT DOCUMENTS

| | | | |
|---|---|---|---|
| D. 341,863 | 11/1993 | Cavasin | D21/226 |
| D. 342,113 | 12/1993 | Cavasin | D21/226 |
| D. 343,669 | 1/1994 | Pratt | D21/226 |
| D. 345,405 | 3/1994 | Cavasin | D21/226 |
| D. 346,192 | 4/1994 | Miller et al. | D21/226 |
| D. 346,633 | 5/1994 | Conte | D21/226 |
| D. 347,672 | 6/1994 | Amey et al. | D21/226 |
| 4,909,523 | 3/1990 | Olson | 280/11.2 |
| 5,048,848 | 9/1991 | Olson et al. | 180/11.22 |
| 5,068,956 | 12/1991 | Malewicz | 29/437 |
| 5,183,276 | 2/1993 | Pratt | 280/11.22 |
| 5,190,301 | 3/1993 | Malewicz | 280/11.22 |
| 5,207,454 | 5/1993 | Blankenburg et al. | 280/843 |
| 5,271,633 | 12/1993 | Hill, Jr. | 280/11.22 |
| 5,286,043 | 2/1994 | Tkaczyk | 280/11.22 |
| 5,303,940 | 4/1994 | Brandner | 280/11.22 |
| 5,308,152 | 5/1994 | Ho | 301/5.3 |
| 5,310,250 | 5/1994 | Gonsior | 301/5.3 |
| 5,312,844 | 5/1994 | Gonsior | 521/99 |
| 5,356,209 | 10/1994 | Hill | 301/5.7 |
| 5,374,072 | 12/1994 | Landers | 280/11.22 |
| 5,482,301 | 1/1996 | Babcock | 280/11.2 |
| 5,503,466 | 4/1996 | Lew | 301/5.3 |

Primary Examiner—Brian L. Johnson
Assistant Examiner—Jonathan E. Butts
Attorney, Agent, or Firm—Thomas W. Tolpin

[57] ABSTRACT

High speed, light weight wheels are provided for in-line roller skates. The high performance wheels each have at least one bearing, a special hub with a light weight fiber-reinforced core, and a high performance tire. The core can comprise symmetrical core sections and can have an array of spokes which connect a hub and an inner rim. Desirably, the light weight core can have a hollow shell upon which the tire is secured.

6 Claims, 10 Drawing Sheets

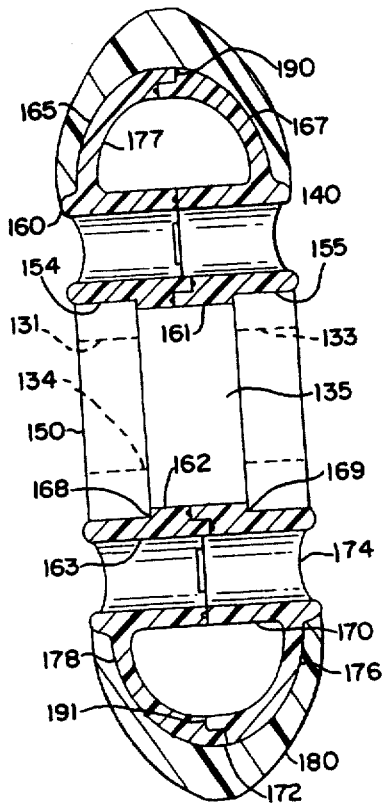

U.S. Patent No: 5,655,785
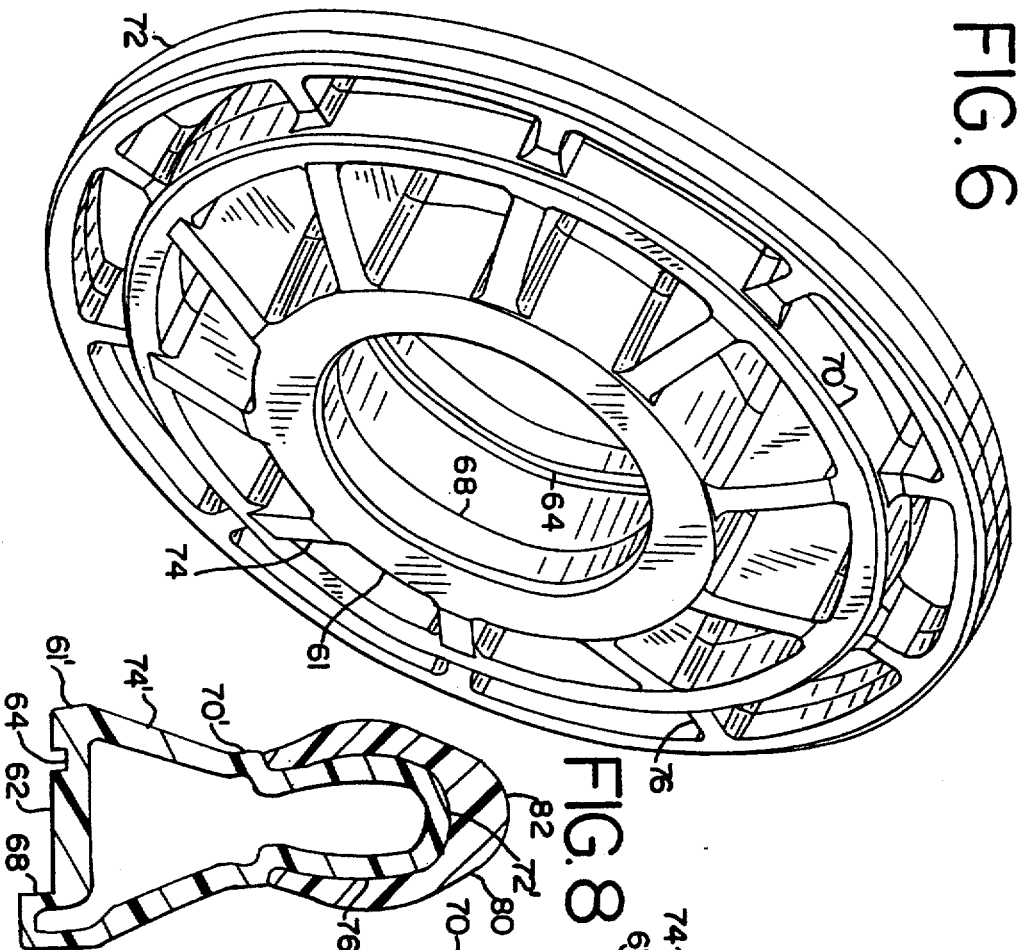
FIG.6
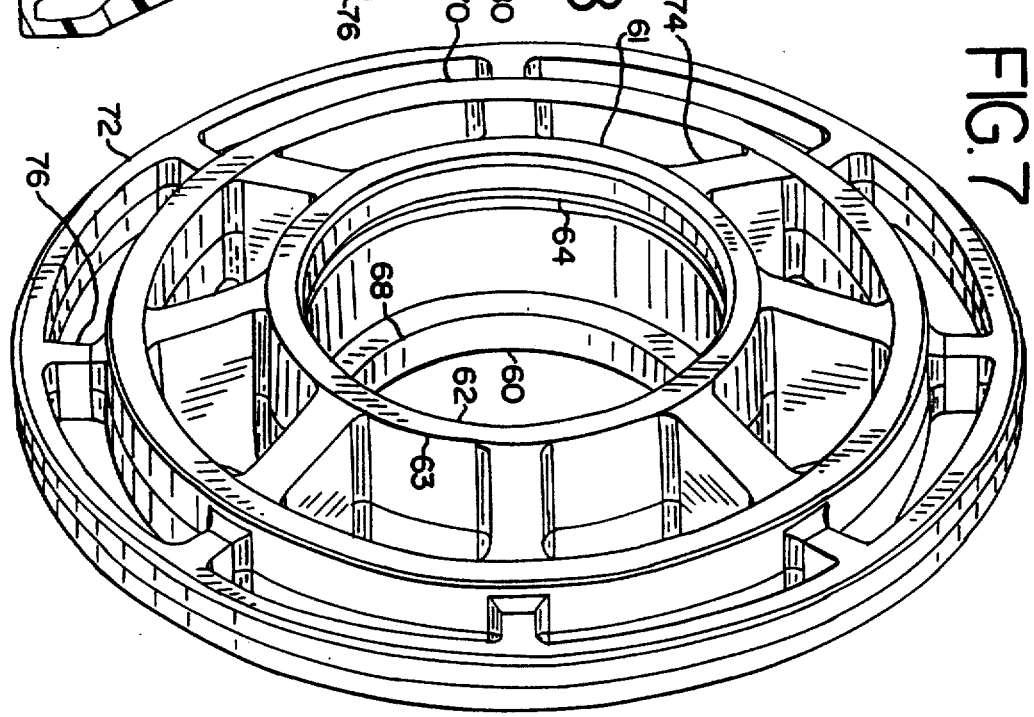
FIG.8
FIG.7

U.S.Patent No: 5,655,785